(12) United States Patent (10) Patent No.: US 12,651,982 B2

Gilmore et al. (45) Date of Patent: Jun. 9, 2026

(54) ELECTROSTATIC CLUTCHES WITH HIGH STRENGTH SUBSTRATE FABRIC

(71) Applicant: Toyota Motor Engineering & Manufacturing North America, Inc., Plano, TX (US)

(72) Inventors: Paul A. Gilmore, Ann Arbor, MI (US); Yuyang Song, Ann Arbor, MI (US); Umesh N. Gandhi, Farmington Hills, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 269 days.

(21) Appl. No.: 18/483,103

(22) Filed: Oct. 9, 2023

(65) Prior Publication Data

US 2025/0119077 A1     Apr. 10, 2025

(51) Int. Cl.
*H02N 13/00* (2006.01)

(52) U.S. Cl.
CPC ................................... *H02N 13/00* (2013.01)

(58) Field of Classification Search
CPC ...................................................... H02N 13/00
USPC ........................................................ 310/309
See application file for complete search history.

(56) References Cited

U.S. PATENT DOCUMENTS

| | | | | | |
|---|---|---|---|---|---|
| 4,393,967 | A | * | 7/1983 | Cuomo ................... | H02N 13/00 |
| | | | | | 192/84.4 |
| 10,355,624 | B2 | * | 7/2019 | Majidi .................... | F16D 28/00 |
| 10,554,154 | B2 | * | 2/2020 | Majidi .................... | F16D 28/00 |
| 10,749,450 | B2 | | 8/2020 | Majidi et al. | |
| 10,998,835 | B2 | | 5/2021 | Majidi et al. | |
| 12,132,419 | B2 | * | 10/2024 | Corrigan .................. | A61F 2/50 |
| 2010/0002354 | A1 | * | 1/2010 | Inazumachi ........... | H02N 13/00 |
| | | | | | 361/234 |
| 2017/0222576 | A1 | * | 8/2017 | Majidi .................... | F16D 27/00 |
| 2019/0363648 | A1 | * | 11/2019 | Majidi .................... | F16D 28/00 |
| 2022/0190749 | A1 | * | 6/2022 | Onuma .................. | H02N 13/00 |
| 2022/0209689 | A1 | * | 6/2022 | Walker .................. | H02N 13/00 |
| 2022/0209690 | A1 | * | 6/2022 | Walker ................. | A41C 3/0057 |
| 2024/0131676 | A1 | * | 4/2024 | Velderman .............. | H02K 7/11 |
| 2024/0213892 | A1 | * | 6/2024 | Diller .................... | F16D 65/125 |

OTHER PUBLICATIONS

Diller et al, "A Lightweight, Low-Power Electroadhesive Clutch and Spring for Exoskeleton Actuation," 2016 IEEE International Conference on Robotics and Automation (ICRA), Stockholm, Sweden (8 pages).

Teschler, "Potential game changer for prosthetics: The electroadhesive clutch," Retrieved from the Internet: <https://www.powerelectronictips.com/potential-game-changer-prosthetics-electroadhesive-clutch/>, retrieved Aug. 17, 2023 (11 pages).

(Continued)

*Primary Examiner* — Forrest M Phillips
(74) *Attorney, Agent, or Firm* — Christopher G. Darrow; Darrow Mustafa PC

(57) ABSTRACT

An electrostatic clutch includes a pair of electrodes configured to be attached to a base material of the electrostatic clutch. The pair of electrodes individually comprise a high strength substrate fabric configured to be attached to the base material and a dielectric layer coupled to the high strength substrate fabric.

20 Claims, 4 Drawing Sheets

(56) References Cited

OTHER PUBLICATIONS

Ramachandra et al., "All-Fabric Wearable Electroadhesive Clutch," Advanced Materials Technologies, 2019 (7 pages).
Hinchet et al., "Glove- and Sleeve-Format Variable-Friction Electrostatic Clutches for Kinesthetic Haptics," Advanced Intelligent Systems, 2022 (15 pages).
Song et al., "Design and Fabrication of Multi-Pouch Inflatable Holding Structure with Higher Payload," 2023 IEEE International Conference on Soft Robotics (RoboSoft) (6 pages).
Sadeghi et al., "A Vacuum Powered Soft Textile-Based Clutch," Jun. 6, 2019, Center for MicroBioRobotics, Istituto Italiano di Tecnologia (IIT), Pisa, Italy (13 pages).

* cited by examiner

ELECTROSTATIC CLUTCHES WITH HIGH STRENGTH SUBSTRATE FABRIC

TECHNICAL FIELD

The present disclosure relates generally to electrostatic clutches, and more particularly, to electrostatic clutches that include high strength fabrics for attaching to base materials.

BACKGROUND

Electrostatic clutches are used to facilitate and block movement of various devices such as wearable electronics and soft robotics. And to use an electrostatic clutch with such a device, the electrostatic clutch is attached to a base material, such as a fabric, of the device. For example, an electrostatic clutch can be attached to a base material (fabric) of a device by stitching an electrostatic clutch substrate material to the fabric. However, electrostatic clutch substrate materials are typically polymers, such as Mylar, which cannot be stitched well. As a result, the strength of the stitched connection between the electrostatic clutch and the fabric is not strong and can break when the clutch is subject to large forces.

The present disclosure addresses issues related to improving the bonding strength of electrostatic clutches to device base materials, and other issues related to electrostatic clutches.

SUMMARY

This section provides a general summary of the disclosure and is not a comprehensive disclosure of its full scope or its features.

In one form of the present disclosure, an electrostatic clutch includes a pair of electrodes configured to be attached to a base material of the electrostatic clutch. The pair of electrodes individually include a high strength substrate fabric configured to be attached to the base material and a dielectric layer coupled to the high strength substrate fabric.

In another form of the present disclosure, an electrostatic clutch includes a pair of electrodes configured to be attached to a base material of the electrostatic clutch. The pair of electrodes individually include a high strength substrate fabric configured to be attached to the base material, a dielectric layer coupled to the high strength substrate fabric, and a conductive layer. The conductive layer is sandwiched between and in direct contact with the high strength substrate fabric and the dielectric layer. Also, a clutch substrate layer coupled to the conductive layer and the high strength substrate fabric can be included and the clutch substrate layer is sandwiched between and in direct contact with the high strength substrate fabric and the conductive layer.

In still another form of the present disclosure, an electrostatic clutch includes a pair of electrodes configured to be attached to a base material of the electrostatic clutch. The pair of electrodes individually include a high strength substrate fabric configured to be attached to the base material, where the high strength substrate fabric is an ultra-high-molecular-weight polyethylene (UHMPE) polyester laminate. A dielectric layer coupled to the high strength substrate fabric and a conductive layer are included and the conductive layer is sandwiched between and in direct contact with the high strength substrate fabric and the dielectric layer. A clutch substrate layer coupled to the conductive layer and the high strength substrate fabric can be included, and in some variations, the clutch substrate layer is sandwiched between and in direct contact with the high strength substrate fabric and the conductive layer. Also, the clutch substrate layer can be biaxially-oriented polyethylene terephthalate.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides an electrostatic clutch (also referred to herein simply as "clutch") with a high strength substrate fabric configured to be attached to a base material of a device such as a wearable electronic device, soft robot, etc. As used herein, the phrase "electrostatic clutch" refers to a lightweight clutch with two flexible sliding conductors (also referred to herein as electrodes) separated by a thin dielectric material. The electrodes are attached to each other and prevented from sliding with respect to one another in response to applying a voltage across the electrodes, and the electrodes slide relative to each other when the voltage is removed. For example, when a voltage is applied across the electrodes, electrons collect on one of the electrodes, causing the electrode to have a negative charge, while a lack of electrons on the other electrode causes the other electrode to have a positive charge. The opposing charges create an electrostatic force such that the electrodes are electrically attracted to each other and thereby inhibit or prevent sliding therebetween. And when the voltage is removed, the electrons equalize between the electrodes, the electrostatic force between the electrodes dissipates, and the electrodes can slide against and relative to each other. The lack and presence of sliding between the electrodes results in the clutch providing engagement and disengagement positions for devices the clutch is coupled or attached to.

The gripping or clutch strength of an electrostatic clutch can be limited by a bonding strength between the clutch and a base material (e.g., a fabric) of a device to which the clutch is attached. Accordingly, in one form of the present disclosure, an electrostatic clutch configured to be attached to, or attached to, a base material of a device has a high bonding strength with the base material. The electrostatic clutch includes a pair of electrodes and each electrode includes a high strength substrate fabric configured to be attached to the base material and a dielectric layer coupled to the high strength substrate fabric. As used herein, the phrase "base material" refers to a material that is part of a device that uses or employs an electrostatic clutch and which is used for attachment of the electrostatic clutch to the device. Non-limiting examples of a base material include fabric from which at least part of wearable electronic device is made of and/or a fabric from which at least part of wearable a soft robot is made of, among others. As used herein, the phrase "high strength substrate fabric" refers to a fabric with a tensile strength that is greater than a tensile strength of a clutch substrate material. And in some variations, the phrase "high strength substrate fabric" refers to a fabric with a tensile strength that is greater than a tensile strength of a base material to which the high strength substrate fabric is attached to and/or is configured to be attached to.

Figure 1:
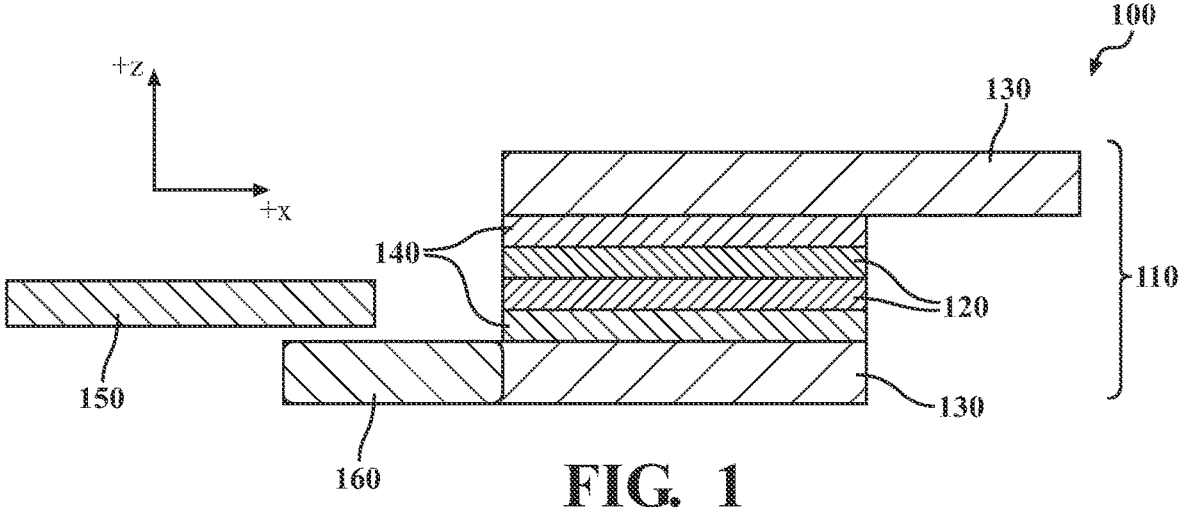
FIG. 1 is a side view of an electrostatic clutch according to the teachings of the present disclosure.

Referring to FIG. 1, one non-limiting example of an electrostatic clutch 100 is shown. The electrostatic clutch 100 includes a pair of opposing electrodes 110 (also referred to herein as "pair of electrodes 110" or "electrodes 110"). In one or more variations, each of the electrodes 110 includes a dielectric layer 120, a high strength substrate fabric 130 and a conductive layer 140. The dielectric layer 120 is, for example, a polytetrafluoroethylene (PTFE) coating, a polyimide (PI) coating, a polyurethane coating, an epoxy resin coating, a ceramic coating, a silicone rubber coating, a nylon coating, a phenolic resin coating, or any other coating suitable for the electrostatic clutch 100. In one or more variations, the electrostatic clutch 100 is configured to receive voltage from a voltage source which results in the pair of electrodes 110 being magnetically attracted to one another. The dielectric layer 120 acts as an insulator and separator between the individual electrodes 110, thereby allowing for the electrostatic clutch 100 to operate as intended.

The high strength substrate fabric 130 is any lightweight fabric that can be attached to a base material and that results in the electrostatic clutch 100 having a high bonding (e.g., tensile and/or shear) strength to or with the base material. As used herein, the phrase "high bonding strength" refers to a bond strength between a lightweight fabric and a base material that is greater than a tensile and/or shear strength of the base material or the holding force of the clutch. Stated differently, the bond between the lightweight fabric and the base material is stronger than the base material itself. In some variations, the high strength substrate fabric 130 is an ultra-high-molecular-weight polyethylene (UHMPE) polyester laminate. Where the high strength substrate fabric 130 is made from a UHMPE polyester laminate, the high strength substrate fabric 130 is, in one or more variations, a sheet of UHMPE fiber laminated between two sheets of polyester. For example, the high strength substrate fabric 130 includes Dyneema® fiber or any other UHMPE fiber.

The conductive layer 140 is any suitable conductive material, such as copper, aluminum, graphite, or carbon composite. In one or more non-limiting examples, the conductive layer 140 is a conductive polymer layer, where the conductive polymer layer is, for example, polypyrrole, PEDOT, or any other conductive polymer. In any case, the conductive layer 140 is, in some variations, sandwiched between and in direct contact with the high strength substrate fabric 130 and the dielectric layer 120. In other variations, one or more additional layers is disposed between the conductive layer 140 and the high strength substrate fabric 130 and/or the dielectric layer 120. However, it should be understood that in all variations, and in response to the electrostatic clutch 100 receiving a voltage from a voltage source (not shown) across the pair of electrodes 110, the conductive layers 140 attract each other, resulting in the pair of electrodes 110 engaging.

In one non-limiting example, the electrostatic clutch 100 is configured to be attached to a base material 150. The base material 150 is, in one or more variations, fabric, such as nylon. The base material 150 may be part of a larger structure, such as an item of clothing, a personal electronic device, a soft robot, etc. In non-limiting examples, the electrostatic clutch 100 is configured to be attached to the base material 150 via the high strength substrate fabric 130. In some variations, the high strength substrate fabric 130 includes an attachment area 160, where the attachment area 160 is a portion of the high strength substrate fabric 130 that extends beyond the length of the dielectric layer 120 and the conductive layer 140. The attachment area 160 is long (x-direction) enough for the high strength substrate fabric 130 to be attached to the base material 150 (e.g., 20-30 millimeters). It should be understood that the length (x-direction) of the attachment area can depend on or be a function of the attachment method. In any case, the high strength substrate fabric 130 can attach to the base material 150 at the attachment area 160.

In one or more variations, the high strength substrate fabric 130 is stitched to the base material 150 of the electrostatic clutch 100. Stitching may include using various stitching methods including a single thread method, a triple thread method, or a 2-triple thread method, where each stitching method involves using a single thread, three threads, and two separate instances of three threads, respectively. In some variations, the high strength substrate fabric 130 has a tensile strength greater than a tensile strength of the base material 150. And in such variations, the bonding strength of the individual pair of electrodes 110 bonded to the base material 150 can be greater than a tensile strength of the base material 150.

In other variations, the high strength substrate fabric 130 is bonded to the base material 150 of the electrostatic clutch 100 with an adhesive. An adhesive is, for example, glue, epoxy, tape, etc. And in such variations, the bonding strength of the individual pair of electrodes 110 bonded to the base material 150 can be greater than a tensile strength of the base material 150.

Figure 2:
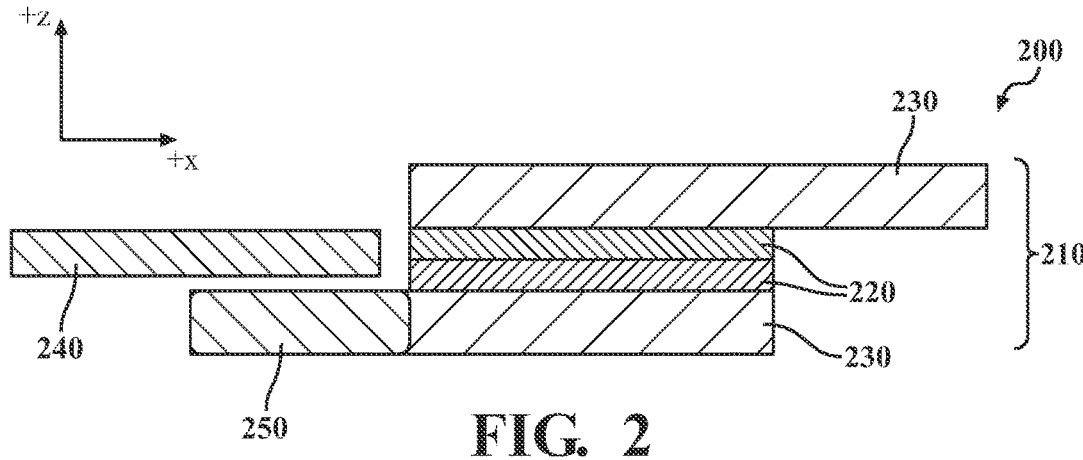
FIG. 2 is a side view of another electrostatic clutch according to the teachings of the present disclosure.

Referring to FIG. 2, another non-limiting example of an electrostatic clutch 200 is shown. As previously discussed and similar to electrostatic clutch 100 shown in FIG. 1, the electrostatic clutch 200 includes a pair of electrodes 210, where each electrode 210 includes a dielectric layer 220 and a high strength substrate fabric 230. And in one or more variations, the high strength substrate fabric 230 is conductive, thus eliminating the need for separate conductive layers as shown in FIG. 1.

In non-limiting examples, the high strength substrate fabric 230 is any conductive fabric material, such as carbon tape or carbon fiber. In response to the electrostatic clutch 200 receiving a voltage from a voltage source (not shown) across the pair of electrodes 210, the high strength substrate fabrics 230 attract each other, resulting in the pair of electrodes 210 engaging.

The pair of electrodes 210 is configured to be attached to a base material 240 at an attachment area 250 of the high strength substrate fabric 230. The high strength substrate fabric 230 may be attached to the base material 240 by stitching the high strength substrate fabric 230 to the base material 240 and/or by bonding the high strength substrate fabric 230 to the base material 240 using an adhesive as described above. In any case, a bonding strength between each electrode 210 and the base material 240 can be greater than a tensile strength of the base material 240.

Figure 3:
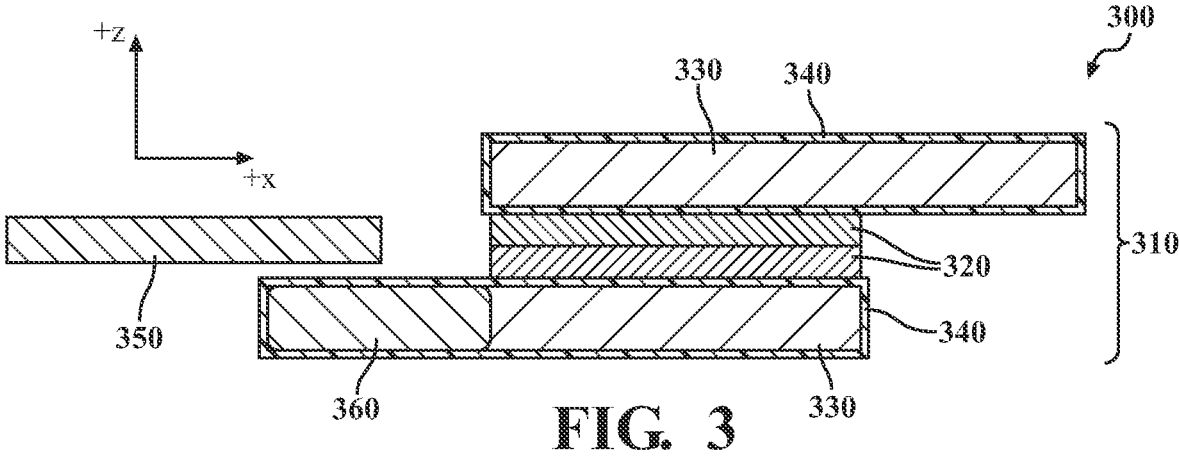
FIG. 3 is a side view of still another electrostatic clutch according to the teachings of the present disclosure.

Referring to FIG. 3, another non-limiting example of an electrostatic clutch 300 is shown. As previously discussed and similar to electrostatic clutch 100 shown in FIG. 1, the electrostatic clutch 300 includes a pair of electrodes 310, where each electrode 310 includes a dielectric layer 320 and a high strength substrate fabric 330. And in one or more variations, each electrode 310 further includes a conducting polymer conformal coating 340 applied to the high strength substrate fabric 330. Thus, as previously discussed and similar to the electrostatic clutch 200 shown in FIG. 2, the electrostatic clutch 300 does not include separate conductive layers in addition to the high strength substrate fabric 330.

In non-limiting examples, the high strength substrate fabric 330 is a UHMPE polyester laminate as discussed above. Applying the conducting polymer conformal coating 340 to the UHMPE polyester laminate aids in attracting the individual electrodes 310 to each other in response to the electrostatic clutch 300 receiving a voltage applied thereto. In particular, responsive to the electrostatic clutch 300 receiving a voltage from a voltage source (not shown) across the pair of electrodes 310, the high strength substrate fabrics 330 with the conducting polymer conformal coatings 340 attract each other, resulting in the pair of electrodes 310 engaging. The conducting polymer conformal coating 340 is, for example, polypyrrole, poly(3,4-ethylenedioxythiophene) (PEDOT), or any other suitable polymer conformal coating.

The pair of electrodes 310 is configured to be attached to a base material 350 at an attachment area 360 of the high strength substrate fabric 330 that includes the conducting polymer conformal coating 340. The high strength substrate fabric 330 may be attached to the base material 350 by stitching the high strength substrate fabric 330 to the base material 350 and/or by bonding the high strength substrate fabric 330 to the base material 350 using an adhesive as described above. In any case, a bonding strength between each electrode 310 and the base material 350 can be greater than a tensile strength of the base material 350.

Figure 4:
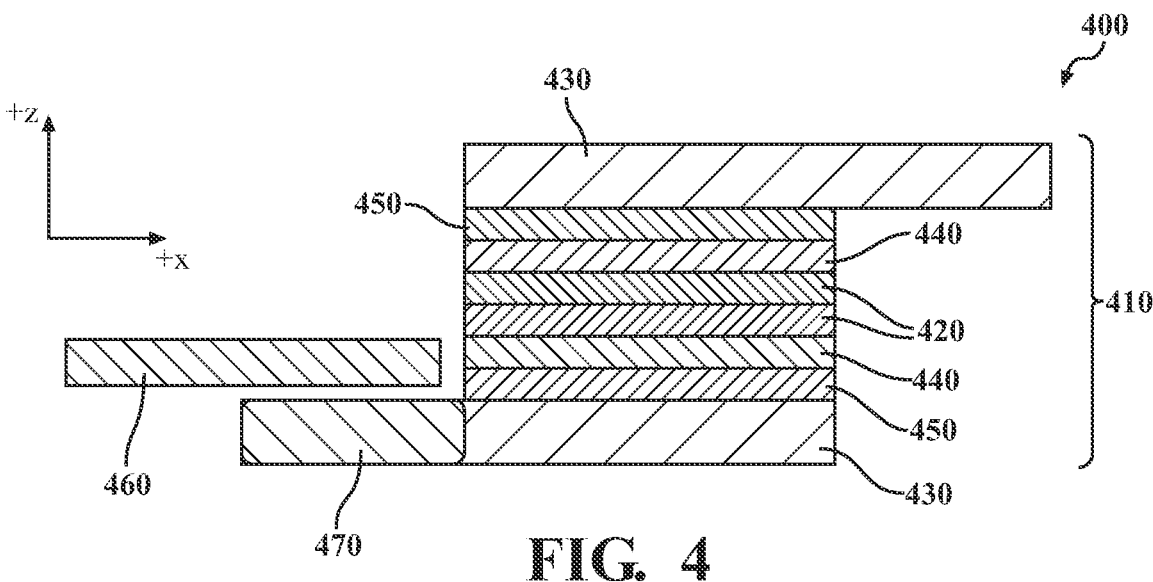
FIG. 4 is a side view of still yet another electrostatic clutch according to the teachings of the present disclosure.

Referring to FIG. 4, another non-limiting example of an electrostatic clutch 400 is shown. As previously discussed and similar to the electrostatic clutch 400 shown in FIG. 1, the electrostatic clutch 400 includes a pair of electrodes 410 and each electrode 410 includes a dielectric layer 420, a high strength substrate fabric 430, and a conductive layer 440. And in one or more variations, each electrode 410 includes a clutch substrate layer 450.

The clutch substrate layer 450 is any material that can support the pair of electrodes 410 and that can couple to the high strength substrate fabric 430. In one non-limiting example, the clutch substrate layer 450 is biaxially-oriented polyethylene terephthalate. In some variations, the clutch substrate layer 450 is coupled to the high strength substrate fabric 430 via heat pressing, i.e., using a heat press machine. In one or more non-limiting examples, heat pressing involves using heat and pressure to bond the high strength substrate fabric 430 to the clutch substrate layer 450, where the heat may range between about 300 to about 360 degrees Fahrenheit (° F.) (about 150° C. to about 180° C.) and the pressure may range between about 5 to 100 pounds per square inch (psi) (about 35 kilopascals (kpa) to about 689 kpa). In some variations, the clutch substrate layer 450 is biaxially-oriented polyethylene terephthalate and the high strength substrate fabric 430 is UHMPE polyester laminate.

As previously discussed, the pair of electrodes 410 is configured to be attached to a base material 460 at the attachment area 470 of the high strength substrate fabric 430. The high strength substrate fabric 330 may be attached to the base material 460 by stitching the high strength substrate fabric 430 to the base material 460 and/or by bonding the high strength substrate fabric 430 to the base material 460 using an adhesive.

In order to better illustrate the teachings of the present disclosure but not limit its teachings in any manner, examples of electrostatic clutches with different materials bonded to each other and their corresponding bond strengths are discussed below.

Figure 5:
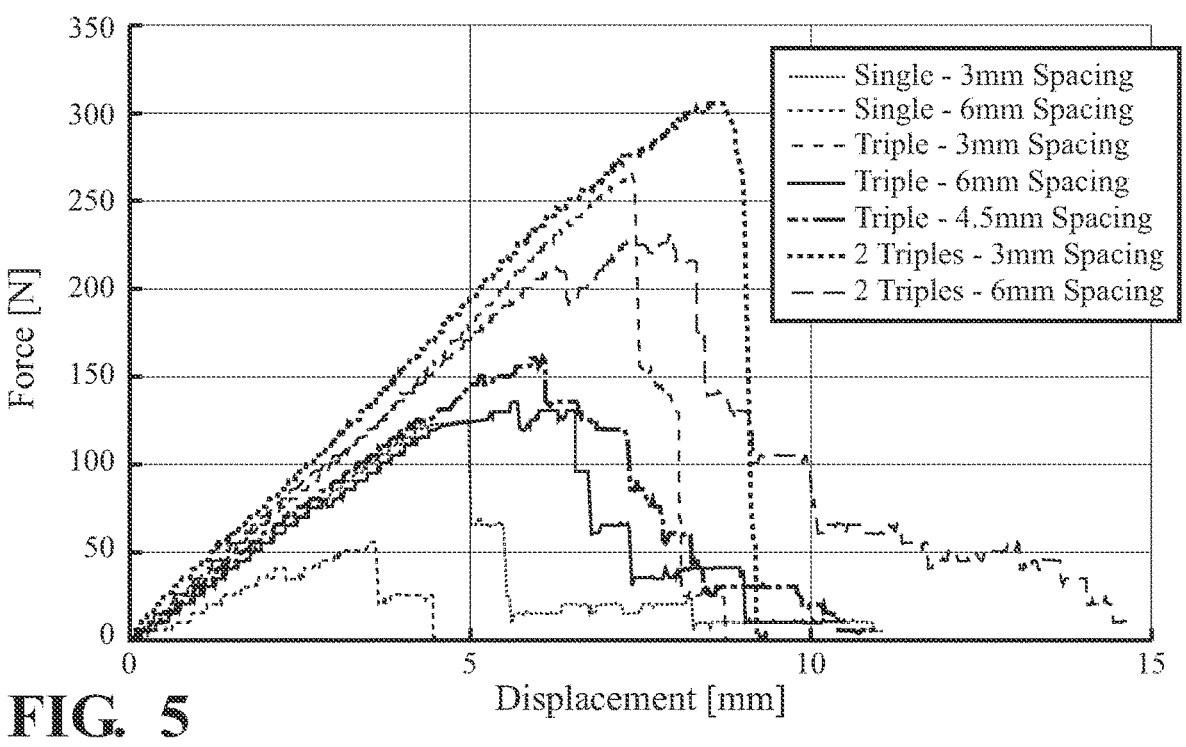
FIG. 5 is a plot of force versus displacement for samples of a biaxially-oriented polyethylene terephthalate substrate stitched to nylon fabric according to the teachings of the present disclosure.
Figure 6:
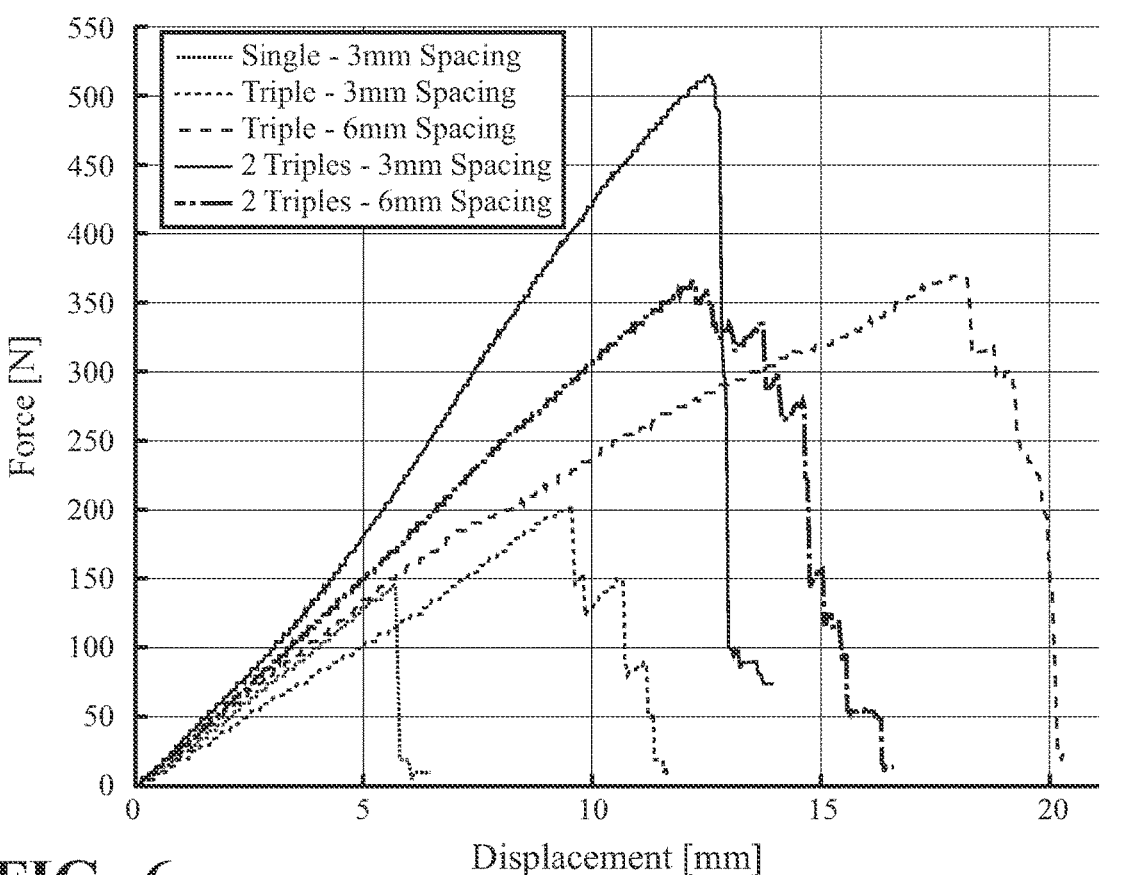
FIG. 6 is a plot of force versus displacement for samples of an ultra-high-molecular-weight polyethylene (UHMPE) polyester laminate stitched to nylon fabric according to the teachings of the present disclosure.

Referring to FIGS. 5 and 6, a plot of force (Newtons (N)) versus displacement (millimeters (mm)) for samples of a biaxially-oriented polyethylene terephthalate substrate stitched bonded to nylon fabric and UHMPE polyester laminate bonded to nylon fabric, respectively, are shown. It should be understood that biaxially-oriented polyethylene terephthalate is a substrate traditionally used to attach (e.g., stitch) electrostatic clutches to base materials such as nylon.

Test samples were prepared by stitching a 127 micron (μm) thick biaxially-oriented polyethylene terephthalate substrate to a 254 μm thick nylon fabric (FIG. 5) and stitching 90 μm thick UHMPE polyester laminate to the nylon fabric (FIG. 6), and pulling the layers of material apart from each other at a speed of 10 mm/s using grippers. Also, the attachment point of the biaxially-oriented polyethylene terephthalate substrate to the nylon fabric was located at 0.5 in. (1.27 cm) from an edge of one end of the biaxially-oriented polyethylene terephthalate substrate or the UHMPE polyester laminate.

The biaxially-oriented polyethylene terephthalate substrate and the UHMPE polyester laminate were stitched to nylon fabric using single-thread (labeled 'Single'), triple-thread (labeled 'Triple'), and 2 triple-thread (labeled '2-Triple') stitching. Further, the thread spacing was varied with single thread stitching samples tested with 3 mm and 6 mm spacing (labeled '3 mm Spacing' and '6 mm Spacing', respectively) between each thread line, the triple thread stitching samples tested with 3, 4.5, and 6 mm spacing (labeled '3 mm Spacing', '4.5 mm Spacing', and '6 mm Spacing', respectively) between each thread line, and the 2-triple thread stitching samples were tested at 3 and 6 mm spacing (labeled '3 mm Spacing' and '6 mm Spacing', respectively) between each thread line. For each test, the biaxially-oriented polyethylene terephthalate substrate and the UHMPE polyester laminate were 1.50 in. (3.8 cm) wide and the nylon fabric was 2.0 in. (5.1 cm) wide.

As illustrated in FIG. 5, the test sample formed from biaxially-oriented polyethylene terephthalate substrate stitched to nylon fabric using 2 triple thread stitching with 3 mm spacing (2 Triples-3 mm Spacing) exhibited the highest force (about 300 N) to pull the biaxially-oriented polyethylene terephthalate substrate and nylon fabric apart from each other. In contrast, the test sample formed from biaxially-oriented polyethylene terephthalate substrate stitched to nylon fabric using single threading stitching with 6 mm spacing (Single-6 mm Spacing) exhibited the lowest force (about 50 N) to pull the biaxially-oriented polyethylene terephthalate substrate and nylon fabric apart from each other.

As illustrated in FIG. 6, the test sample formed from UHMPE polyester laminate stitched to nylon fabric using 2 triple-thread stitching with 3 mm spacing (2 Triples-3 mm Spacing) exhibited the highest force (about 510 N) to pull the UHMPE polyester laminate and nylon fabric apart from each other. In contrast, the test sample formed from UHMPE polyester laminate stitched to nylon fabric using single threading stitching with 6 mm spacing (Single-6 mm Spacing) exhibited the lowest force (about 150 N) to pull the UHMPE polyester laminate and nylon fabric apart from each other. In addition, the test sample formed from UHMPE polyester laminate stitched to nylon fabric using triple-thread stitching with 3 mm spacing (Triple-3 mm Spacing) exhibited a force of about 370 N to pull the UHMPE polyester laminate and nylon fabric apart from each other. Accordingly, it should be understood that the UHMPE polyester laminate stitched to nylon fabric provided a bonding strength about 1.7 times greater than the bonding strength of biaxially-oriented polyethylene terephthalate substrate stitched to nylon fabric when using the same stitching technique and the UHMPE polyester laminate stitched to nylon fabric using the Triple-3 mm Spacing technique exhibited a bonding strength greater than the maximum bonding strength exhibited by any of the biaxially-oriented polyethylene terephthalate substrate stitched to nylon fabric test samples. In addition, the 2 Triples-3 mm Spacing UHMPE polyester laminate stitched to nylon fabric test sample exhibited the force of about 510 N at a displacement of about 13 mm whereas the 2 Triples-3 mm Spacing biaxially-oriented polyethylene terephthalate stitched to nylon fabric test sample exhibited a force of about 305 N at a displacement of only about 9 mm.

Figure 7:
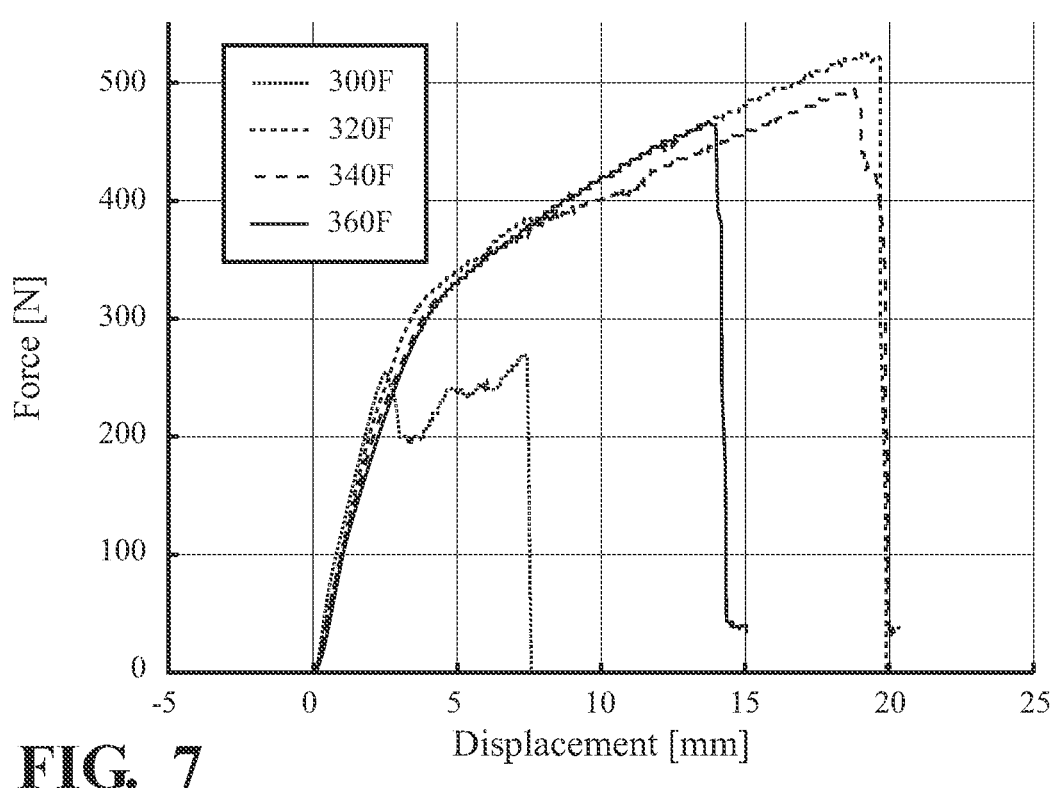
FIG. 7 is a plot of force versus displacement for samples of Nylon fabric bonded to a biaxially-oriented polyethylene terephthalate clutch substrate using different heat press temperatures according to the teachings of the present disclosure.

Referring to FIG. 7, a plot of force (N) versus displacement (mm) for test samples of a UHMPE polyester laminate attached to a biaxially-oriented polyethylene terephthalate substrate using heat pressing at different temperatures is shown. The test samples were formed by heat pressing a 127 micron (μm) biaxially-oriented polyethylene terephthalate substrate to UHMPE polyester laminate at 300° F. (149° C.), 320° F. (160° C.), 340° F. (171° C.), and 360° F. (182° C.), and the layers of material were pulled apart for each other at a speed of 10 mm/s using grippers. And as shown in FIG. 7, the highest shear strength was obtained for the test sample that was formed with a heat press temperature of 320° F. (160° C.).

Figure 8:
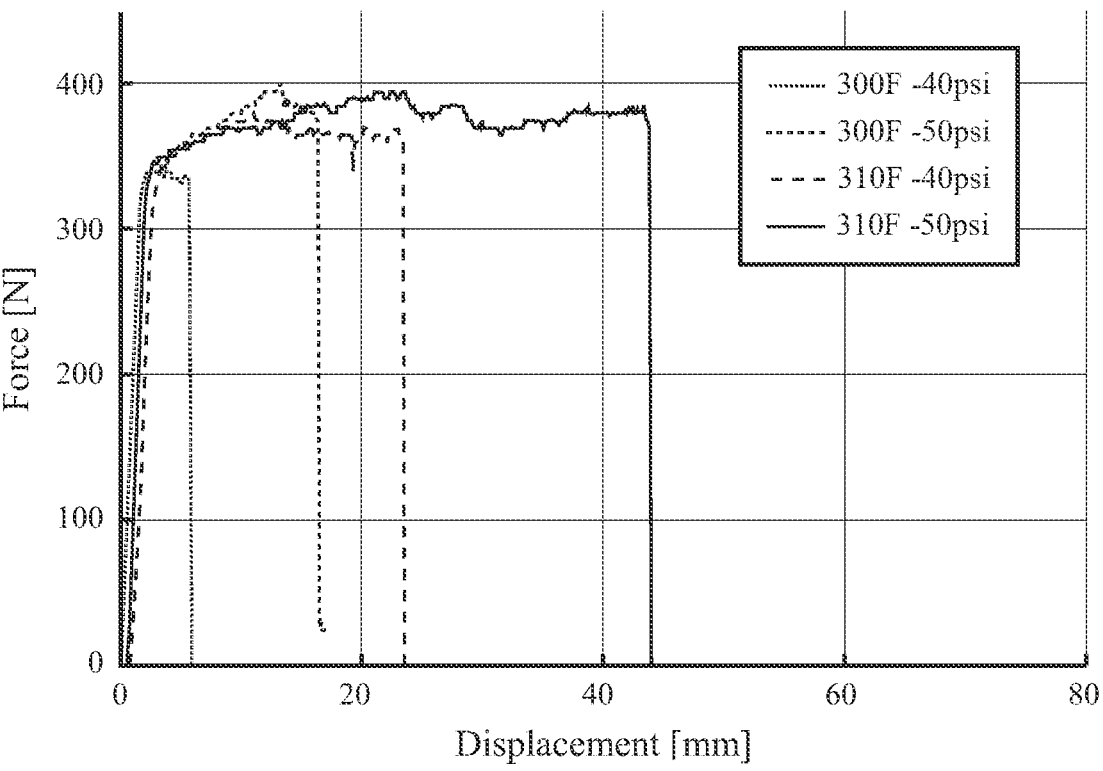
FIG. 8 is a plot of force versus displacement for samples of an UHMPE polyester laminate attached to a biaxially-oriented polyethylene terephthalate clutch substrate using different heat press pressure temperatures and pressures according to the teachings of the present disclosure.

Referring to FIG. 8, a plot of force (N) versus displacement (mm) for test samples of a UHMPE polyester laminate attached to a biaxially-oriented polyethylene terephthalate substrate using heat pressing at different temperatures and different pressures is shown. Particularly, test samples were heat pressed at 300° F. (149° C.) using 40 psi (276 kpa) of pressure (300 F-40 psi), 300° F. (149° C.) using 50 psi (345 kpa) of pressure (300 F-50 psi), 310° F. (154° C.) using 40 psi (276 kpa) of pressure (310 F-40 psi), and 310° F. (154° C.) using 50 psi (345 kpa) of pressure (300 F-40 psi). And as shown in FIG. 8, the highest shear strength was obtained for test samples formed with a 310° F. (154° C.) heat press temperature and 40 psi (275 kpa) and 50 psi (345 kpa) heat press pressures. However, at a heat press temperature of 300° F. (149° C.), a higher shear strength was achieved when using a pressure of 50 psi (345 kpa) compared to a heat press pressure of 40 psi (276 kpa).

The preceding description is merely illustrative in nature and is in no way intended to limit the disclosure, its application, or uses. Work of the presently named inventors, to the extent it may be described in the background section, as well as forms and/or variations of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any form or variation thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one form or variation, or various forms or variations means that a particular feature, structure, or characteristic described in connection with the form or variation or particular system is included in at least one form or variation of the present disclosure. The appearances of the phrase "in one form" or "in one variation" (or variations thereof) are not necessarily referring to the same form or variation. It should also be understood that the various method steps discussed herein do not have to be carried out in the same order as depicted, and not each method step is required in each form or variation.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. An electrostatic clutch comprising:
a pair of electrodes configured to be attached to a separate fabric base material, the pair of electrodes individually comprising:
a high strength substrate fabric configured to be attached to the separate fabric base material; and
a dielectric layer coupled to the high strength substrate fabric.

2. The electrostatic clutch of claim 1, wherein the high strength substrate fabric is selected from the group consisting of carbon fabric and carbon tape.

3. The electrostatic clutch of claim 1, wherein the pair of electrodes individually further comprise a conductive layer and the high strength substrate fabric is an ultra-high-molecular-weight polyethylene polyester laminate.

4. The electrostatic clutch of claim 3, wherein the conductive layer is sandwiched between the high strength substrate fabric and the dielectric layer.

5. The electrostatic clutch of claim 4, wherein the conductive layer is a conductive polymer layer.

6. The electrostatic clutch of claim 5, wherein the conductive layer is in direct contact with the high strength substrate fabric and the dielectric layer.

7. The electrostatic clutch of claim 6, wherein the high strength substrate fabric is the ultra-high-molecular-weight polyethylene polyester laminate with a conducting polymer conformal coating.

8. The electrostatic clutch of claim 3, further comprising a clutch substrate layer coupled to the conductive layer and the high strength substrate fabric.

9. The electrostatic clutch of claim 8, wherein the clutch substrate layer is sandwiched between the high strength substrate fabric and the conductive layer.

10. The electrostatic clutch of claim 9, wherein the clutch substrate layer is in direct contact with the high strength substrate fabric and the conductive layer.

11. The electrostatic clutch of claim 10, wherein the clutch substrate layer is heat pressed and coupled to the high strength substrate fabric.

12. The electrostatic clutch of claim 11, wherein the clutch substrate layer is biaxially-oriented polyethylene terephthalate.

13. The electrostatic clutch of claim 1, wherein the high strength substrate fabric is stitched to the base material of the electrostatic clutch.

14. The electrostatic clutch of claim 13, wherein a bonding strength of the high strength substrate fabric bonded to the base material is greater than a tensile strength of the base material.

15. The electrostatic clutch of claim 14, wherein a bonding strength of each of the pair of electrodes bonded to the base material is greater than a tensile strength of the base material.

16. The electrostatic clutch of claim 1, wherein the high strength substrate fabric is bonded to the base material of the electrostatic clutch with an adhesive and a bonding strength of the high strength substrate fabric bonded to the base material is greater than a tensile strength of the base material.

17. An electrostatic clutch comprising:
a pair of electrodes configured to be attached to a separate fabric base material, wherein the pair of electrodes individually comprise:
a high strength substrate fabric attached to the separate fabric base material;
a dielectric layer coupled to the high strength substrate fabric;
a conductive layer, wherein the conductive layer is sandwiched between and in direct contact with the high strength substrate fabric and the dielectric layer; and
a clutch substrate layer coupled to the conductive layer and the high strength substrate fabric, wherein the clutch substrate layer is sandwiched between and in direct contact with the high strength substrate fabric and the conductive layer.

18. The electrostatic clutch of claim 17, wherein the high strength substrate fabric is stitched to the separate fabric base material of the electrostatic clutch and a bonding strength of the high strength substrate fabric bonded to the base material is greater than a tensile strength of the base material.

19. The electrostatic clutch of claim 17, wherein the high strength substrate fabric is bonded to the separate fabric base material of the electrostatic clutch with an adhesive and a bonding strength of the high strength substrate fabric bonded to the base material is greater than a tensile strength of the base material.

20. An electrostatic clutch comprising:
a pair of electrodes configured to be attached to a separate fabric base material, wherein the pair of electrodes individually comprise:
a high strength substrate fabric configured to be attached to the separate fabric base material, wherein the high strength substrate fabric is an ultra-high-molecular-weight polyethylene polyester laminate;
a dielectric layer coupled to the high strength substrate fabric;
a conductive layer, wherein the conductive layer is sandwiched between and in direct contact with the high strength substrate fabric and the dielectric layer; and
a clutch substrate layer coupled to the conductive layer and the high strength substrate fabric, wherein the clutch substrate layer is sandwiched between and in direct contact with the high strength substrate fabric and the conductive layer, and wherein the clutch substrate layer is biaxially-oriented polyethylene terephthalate.

* * * * *